United States Patent
Lipka et al.

(10) Patent No.: US 8,427,934 B2
(45) Date of Patent: Apr. 23, 2013

(54) SINGLE CARRIER FREQUENCY DIVISION MULTIPLE ACCESS TECHNIQUE

(75) Inventors: Dietmar Lipka, Berg (DE); Steffen Reinhardt, Nürnberg (DE); Stefan Mueller-Weinfurtner, Nürnberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 342 days.

(21) Appl. No.: 12/867,287

(22) PCT Filed: Feb. 10, 2009

(86) PCT No.: PCT/EP2009/051479
§ 371 (c)(1),
(2), (4) Date: Aug. 12, 2010

(87) PCT Pub. No.: WO2009/101065
PCT Pub. Date: Aug. 20, 2009

(65) Prior Publication Data
US 2010/0329229 A1    Dec. 30, 2010

Related U.S. Application Data

(60) Provisional application No. 61/028,666, filed on Feb. 14, 2008.

(30) Foreign Application Priority Data

Feb. 12, 2008   (EP) ..................................... 08002550

(51) Int. Cl.
*H04J 11/00*   (2006.01)

(52) U.S. Cl.
USPC ............................ 370/203; 370/281; 370/344

(58) Field of Classification Search .................. 370/203, 370/281, 344
See application file for complete search history.

(56) References Cited

U.S. PATENT DOCUMENTS

| | | | |
|---|---|---|---|
| 7,983,145 B2 * | 7/2011 | Frenger | 370/208 |
| 8,116,239 B2 * | 2/2012 | Proctor et al. | 370/279 |
| 2007/0004465 A1 * | 1/2007 | Papasakellariou et al. | 455/571 |
| 2010/0039927 A1 * | 2/2010 | Noh et al. | 370/210 |
| 2010/0121617 A1 * | 5/2010 | Gruener et al. | 703/2 |
| 2010/0142364 A1 * | 6/2010 | Sahlman | 370/210 |

OTHER PUBLICATIONS

Babic, H., "Sequences for DFT Interpolation", 1991, Electrotechnical Converence, 6th Mediterranean Proceedings, vol. 1, pp. 391-395.*

Cavicchi, T. J., "DFT Time-Domain Interpolation", Jun. 1992, IEE Proceedings-F, vol. 139, No. 3, pp. 207-211.*

(Continued)

*Primary Examiner* — Jason Mattis
(74) *Attorney, Agent, or Firm* — Roger S. Burleigh

(57) ABSTRACT

A technique for generating a single carrier frequency division multiple access (SC-FDMA) signal is described, in which from a set of M input symbols a set of N output symbols (M<N) is generated. A method implementation of this technique comprises receiving a set of M input symbols in a time domain representation, subjecting the set of M input symbols to an interpolation operation in the time domain to obtain L interpolated samples (L≦N), mapping the interpolated symbols, or symbols derived from the interpolated symbols, to N orthogonal sub-carriers, and outputting N output symbols in a time domain representation.

25 Claims, 8 Drawing Sheets

OTHER PUBLICATIONS

Offelle, C. et al., "Interpolation Techniques for Real-Time Multifrequency Waveform Analysis", 1990, IEEE transactions on Instrumentation and Measurement, vol. 30, Issue 1, pp. 106-111.*

Gillian Huang, Andrew Nix and Simon 1-14, Armour: "Impact of Radio Resource 9-22 Allocation and Pulse Shaping on Papr of SC-FDMA Signals" The 18th Annual IEEE International Symposium on Personal, Indoor and Mobile Radio Communications (PIMRC' on, [online]Sep. 3-7, 2007 XP002490022.

Myung, H.G. et al. Peak-to-Average Power Ration of Single Carrier FDMA Signals with Pulse Shaping. IEEE International Symposium on Personal Indoor and Mobile Radio Communications. Sep. 11, 2006.

Myung, H.G. et al. Single Carrier FDMA for Uplink Wireless Transmission. IEEE Vehicular Technology Magazine, Sep. 2006.

3GPP. 3rd Generation Partnership Project; Technical Specification Group Radio Access Network; Evolved Universal Terrestrial Radio Access (E-UTRA); Physical Channels and Modulation (Release 8). 3GPP TS 23.211 V8.0.0 Sep. 2007.

* cited by examiner

SINGLE CARRIER FREQUENCY DIVISION MULTIPLE ACCESS TECHNIQUE

This application claims the benefit of U.S. Provisional Application No. 61/028,666, filed Feb. 12, 2008, the disclosure of which is fully incorporated herein by reference.

TECHNICAL FIELD

The invention generally relates to signal processing. Specifically, the invention is directed at a single carrier frequency division multiple access (SC-FDMA) technique for use in a wireless communications system.

BACKGROUND

In multi-transmitter wireless communications systems, channel access techniques allow multiple transmitters connected to the same physical channel to share its transmission capacity. Various channel access techniques are known in the art. In second generation communications systems according to the Global System for Mobile communications (GSM) standard, Time Division Multiple Access (TDMA) techniques are utilized to divide a specific frequency channel into individual time slots which are then assigned to individual transmitters. In third generation communications systems, Code Division Multiple Access (CDMA) techniques divide channel access in the signal space by employing a combination of spread spectrum operations and a special coding scheme in which each transmitter is assigned an individual code. The next advance in wireless communications systems considers Orthogonal Frequency Division Multiple Access (OFDMA) techniques to achieve still higher bit rates.

One major advantage of OFDMA over other channel access techniques is its robustness in the presence of multi-path signal propagation. On the other hand, the waveform of OFDMA signals exhibits very pronounced envelope fluctuations resulting in a high Peak-to-Average Power Ratio (PAPR). Signals with high PAPR require highly linear power amplifiers to avoid excessive inter-modulation distortion, and these power amplifiers have to be operated with a large back-off from their peak power. The result is a low power efficiency, which places a significant burden on battery operated transmitters such as mobile telephones.

The disadvantage of a high PAPR is overcome by SC-FDMA, which can be regarded as a modification of OFDMA. For this reason, the Third Generation Partnership Project (3GPP) is considering using SC-FDMA in fourth generation communications systems for the uplink direction towards the access network. In context with the Long Term Evolution (LTE) project of 3GPP, the Technical Specification TS 36.211 V8.0.0 'Physical Channels and Modulation', September 2007, specifies the time-continuous SC-FDMA signal $s_l(t)$ as (using the notation defined in TS 36.211 hereinafter):

$$s_l(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k^{(-)},l} \cdot e^{j2\pi(k+1/2)\Delta f(t-N_{CP,l}T_s)} \text{ for}$$

$$0 \le t < (N_{CP,l} + N)T_s.$$

With sub-carrier spacing $\Delta f = 1/(NT_s)$, and with the number of orthogonal sub-carriers in one half of the available uplink spectrum $$B = N_{RB}^{UL} N_{sc}^{RB}/2,$$

which—with the possible parameter values specified in TS 36.211—is guaranteed to be integer, the following expression for symbols of the time-continuous SC-FDMA signal can be obtained:

$$s_l(nT_s) = \sum_{k=-B}^{B-1} a_{k^{(-)},l} \cdot e^{j2\pi(k+1/2)(n-N_{CP,l})/N} \text{ for } 0 \le n < (N_{CP,l} + N).$$

The frequency-domain index of a resource element (RE) is $k^{(-)} = k+B$ with $0 \le k^{(-)} < 2B$.

The modulation symbols to be mapped on resource elements are specified—for SC-FDMA symbol l=0, which does not restrict the generality—as:

$$z(k^{DFT}) = \sum_{i=0}^{M_{sc}^{PUSCH}-1} d(i) \cdot e^{-j2\pi k^{DFT} i / M_{sc}^{PUSCH}} \text{ for } 0 \le k^{DFT} < M_{sc}^{PUSCH}.$$

The complex-valued symbols from data mapping (baseband modulation) are given by d(i). The mapping of modulation symbols to REs is done such that $k^{(-)} = k_0 + f_{hop} + k^{DFT} = K + k^{DFT}$ with $K = k_0 + f_{hop}$.

An exemplary implementation of an SC-FDMA modulator stage is discussed in Myung et al., 'Single Carrier FDMA for Uplink Wireless Transmission', IEEE Vehicular Technology Magazine, pp. 30-38, September 2006. Another exemplary realization of an SC-FDMA modulator stage 10 will now be discussed with reference to the schematic illustration in FIG. 1.

The modulator stage 10 receives as input signal a multi-level sequence of complex-valued symbols in one of several possible modulation formats such as Binary Phase Shift Keying (BPSK) or 16 level Quadrature Amplitude Modulation (16-QAM). The modulation symbols are received in sets (also called blocks) containing M symbols each, and every set of M symbols is subjected to an M-point Discrete Fourier Transform (DFT) in a DFT block 12 to obtain a frequency domain representation of the M symbols.

Next, the M DFT outputs are mapped to one of N (N>M) orthogonal sub-carriers in a mapping block 14. In TS 36.211, the value of M is defined to be $M_{sc}^{PUSCH} = 12 \cdot 2^{\alpha_2} \cdot 3^{\alpha_3} \cdot 5^{\alpha_5} \le 1320.$ The mapping block 14 outputs a set of N complex sub-carrier amplitudes, and exactly M of the amplitudes will be non-zero.

The sub-carrier amplitudes output by the mapping block 14 are re-transformed by an Inverse Fast Fourier Transform (IFFT) block 16 to a time domain signal, and the time domain signal is subjected to a phase rotation in a block 18 to correct any phase errors introduced by the previous signal processing operations in blocks 12 to 16. In addition to subjecting the output signal of the IFFT block 16 to a phase rotation, a Cyclic Prefix (CP) is inserted also (not shown in FIG. 1). The CP provides a guard-time between two sequentially transmitted symbol blocks to reduce inter-block interference caused by multi-path propagation.

One drawback of conventional SC-FDMA transmitters is the implementation of the DFT block 12. Let M be the number of input symbols, then the number of multiplications and additions that will have to be performed in the DFT block 12 is in the order of M*M. For this reason, considerable processing power is required to realize the transmitter stage 10, and processing power is a scarce resource especially in battery operated transmitters. To reduce the required processing power, a mixed radix FFT according to the Cooley-Tukey algorithm can be implemented. As is well known, such a mixed radix FFT is most efficient if M is a product of as low as possible prime factors. (And for this reason, TS 36.211 restricts the prime factors of M to 2, 3 and 5 as shown in the above formula.)

The restriction to specific prime factors imposes an undesirable restriction on the possible values of M. Moreover, it has been found that hardware implementations of mixed radix FFTs are often rather complicated.

SUMMARY

Accordingly, it is an object of the present invention to provide an efficient SC-FDMA technique that avoids at least some of the drawbacks associated with conventional DFT operations.

This object is achieved by a method of generating an SC-FDMA signal, in which from a set of M input symbols a set of N output symbols, with M<N, is generated. The method comprises receiving a set of M input symbols in a time domain representation, subjecting the set of M input symbols to a first interpolation operation in the time domain to obtain L interpolated symbols, with L<=N, wherein each interpolated symbol is calculated from K input symbols, with K<=M, mapping the interpolated symbols, or symbols derived (e.g., by one or more further processing operations) from the interpolated symbols, to N orthogonal sub-carriers, and outputting N output symbols in a time domain representation. The resulting set of N output symbols may then be transmitted as SC-FDMA signal in a single transmission block.

In one implementation, the size of the set of M input symbols that are being received together is variable. In other words, the SC-FDMA signal generation may, for example, be switchable between a first operational mode processing sets of $M_1$ input symbols and a second operational mode processing sets of $M_2$ input symbols, with $M_1 \neq M_2$. According to a first variant, the value(s) of L and/or K will also be changed when the operational mode is changed (for example in a manner directly proportional to changes of M). According to a second variant, the value(s) of L and/or K will be kept constant regardless of any changes in the size in the set of M input symbols that are being received together.

The first interpolation operation may have a characteristic interpolation kernel of the length K<=M. Interpreting the interpolating operation as a filter operation, the interpolation kernel will give rise to a characteristic pulse shape of the filtered signal. In this regard, the interpolation kernel may for example correspond to a pulse shape with a main pulse and side pulses. Such a pulse shape can for example be obtained by a sin x/x function (i.e. a cardinal sine, or sinc, function).

An optional truncation may be performed to modify the pulse shape in a specific manner. The truncation may include calculating each interpolated symbol from a set of K input symbols, with K<M. With K<M, the overall length of a pulse may be reduced (for example by cutting off one or more side pulses).

The truncation may introduce a small signal error which may be tolerable in view of the overall performance gain. The error is typically reverse proportional to the length K (filter length) of the interpolation kernel and can be reduced by tapering the interpolation kernel. The tapering may be performed using windowing techniques (e.g., using a Kaiser-Bessel window). The actual value of K<M could be selected such that any errors introduced by the resulting truncation are as low as possible, while K is at the same time sufficiently small to significantly reduce the number of calculation operations (such as multiplications and additions) compared to the case K=M.

The step of mapping the interpolated symbols (or symbols derived from the interpolated symbols) to orthogonal sub-carriers may be performed in various ways. Basically, the mapping may be performed either in the frequency domain (in which case N sub-carrier amplitudes may be explicitly calculated during the mapping operation) or in the time domain. In one realisation, the sub-carrier mapping comprises a phase rotation operation in the time domain. The input symbols may also be subjected to a phase rotation operation prior to the first interpolation operation. This initial phase rotation operation may be performed in addition to a later phase rotation operation performed in context with the sub-carrier mapping step.

The method may further comprise performing a cyclic extension operation at any stage of the signal processing. The cyclic extension operation is performed such that a CP will be included in the output signal. In one variant, the cyclic extension is performed prior to the first interpolation operation. According to another variant, the cyclic extension occurs only after at least one of the first interpolation operation and the sub-carrier mapping.

The number of L interpolated symbols obtained by the first interpolation operation may be selected such that L=N. Compared to the case L=N, the first interpolation operation may be simplified by calculating less than N interpolated samples.

According to one realization of the SC-FDMA signal generation, the first interpolation operation is controlled such that from the set of M input symbols a set of L interpolated symbols is obtained, wherein $L=2^n$, with n=0, 1, 2, 3 and so on. L may additionally be chosen to be the smallest number for which L>=M holds.

The first interpolation operation may for example be described by $$y(lT_s) = \sum_{i=0}^{M-1} d(i) \cdot e^{-j\pi \frac{M-1}{M} i} \cdot MP_M\left(\left(l - \frac{L}{M}i\right)/L\right)$$

where $$P_M(x) = \frac{\sin(M\pi x)}{M\sin(\pi x)},$$

with d(i) being the i th input symbol and l=0, 1, 2, ... L−1. For calculating a single interpolated sample, K symbols of $P_M(x)$ may be considered.

As mentioned above, in one variant the interpolation operation is controlled such that from the set of M input symbols a set of L interpolated symbols is obtained, with $L=2^n$. L may additionally be chosen to be a power of two fraction of the number N of output symbols (e.g., the smallest such number). In such and other cases, the method may further comprise performing one or more second interpolation operations using a filter cascade with a plurality of filter stages, each filter stage interpolating by a factor of two. The output symbols may then be defined by windowing an output signal of the filter cascade.

The interpolated symbols obtained by the first interpolation operation may be subjected to an FFT. In this way, a frequency domain representation of the interpolated symbols may be obtained. At a later processing stage, the frequency domain symbols may be subjected to an IFFT to again obtain a time domain representation. Before or after performing the IFFT, the symbols generated by the FFT may be subjected to a sub-carrier mapping operation.

The techniques presented herein may be realised in the form of software, in the form of hardware, or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a hard disk, and so on.

According to a further aspect, an SC-FDMA modulator is provided that is adapted to generate from a set of M input symbols a set of N output symbols, with M<N. The modulator comprises an interpolator adapted to subject the set of M input symbols received in a time domain representation to a first interpolation operation in the time domain to obtain L interpolated symbols, with L<=N, wherein each interpolated symbol is calculated from K input symbols, with K<=M, and a mapper adapted to map the interpolated symbols, or symbols derived from the interpolated symbols, to N orthogonal sub-carriers, wherein N output symbols in a time domain representation are obtained. Moreover, a transmitter may be provided for consecutively transmitting the resulting set of the N output symbols in one transmission block.

The modulator may further comprise an FFT module adapted to subject the interpolated symbols obtained by the first interpolation operation to an FFT. Additionally, an IFFT module may be provided that is adapted to subject the symbols generated by the FFT module to an IFFT. The mapper may be arranged between the FFT module on the one hand and the IFFT module on the other hand. The mapper may thus be adapted to operate in the frequency domain. Alternatively, the mapper may be arranged after the IFFT module and may be adapted to operate in the time domain.

The modulator may also comprise a filter cascade adapted to perform one or more second interpolation operations. In one realization, the filter cascade comprises a plurality of filter stages, and each filter stage interpolates by a factor of two. A cyclic extension generator adapted to process the symbols such that a cyclic prefix will be included in the output signal of the modulator may be provided also.

BRIEF DESCRIPTION OF THE DRAWINGS

Further aspects and advantages of the technique presented herein will become apparent from the following description of preferred embodiments and the drawings, wherein.

DESCRIPTION OF PREFERRED EMBODIMENTS

In the following description of preferred embodiments, for purposes of explanation and not limitation, specific details are set forth (such as particular signal processing components and sequences of steps) in order to provide a thorough understanding of the present invention. It will be apparent to one skilled in the art that the present invention may be practiced in other embodiments that depart from these specific details.

Figure 2:
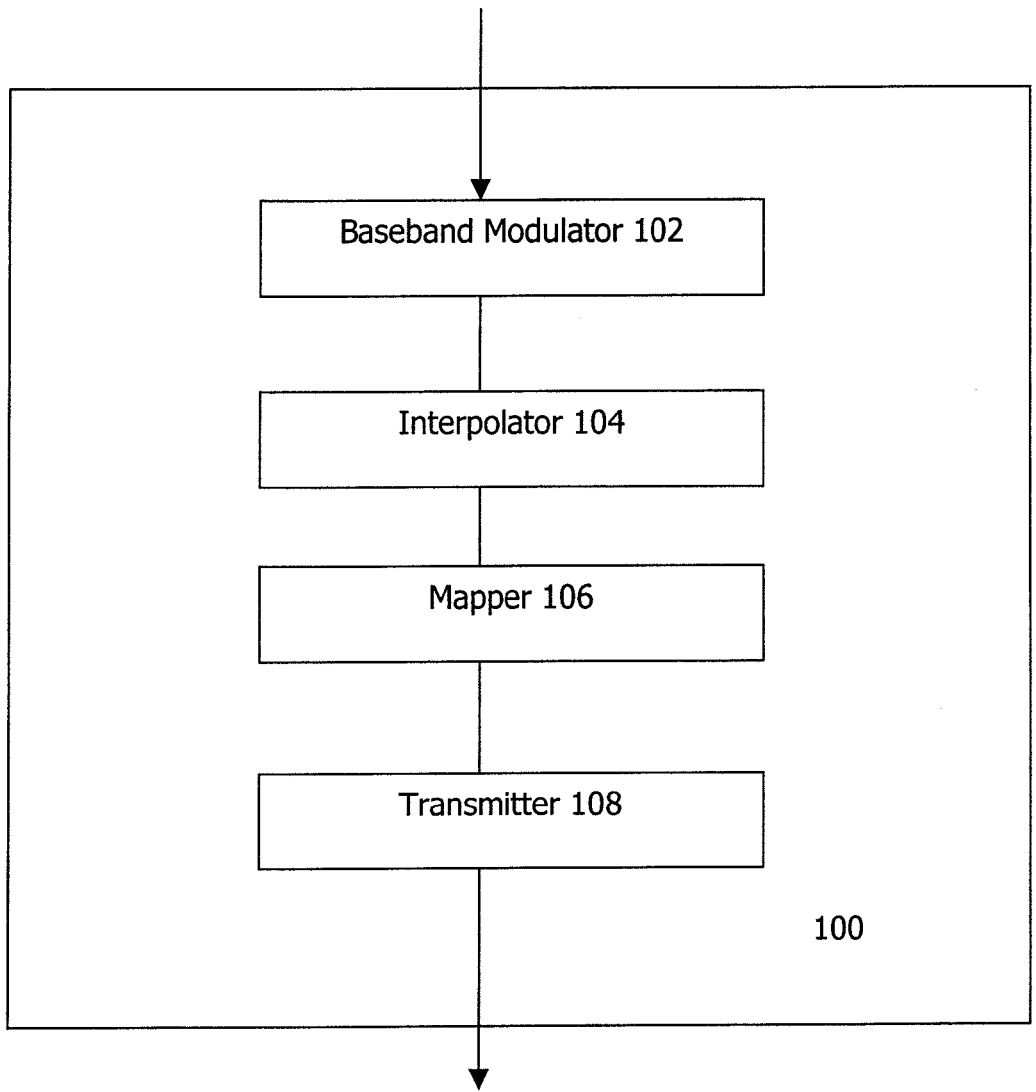
FIG. 2 schematically illustrates an SC-FDMA system including an SC-FDMA modulator embodiment.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein. FIG. 2 shows an exemplary SC-FDMA system 100 that can be implemented in accordance with the LTE standard in a mobile terminal (such as a mobile telephone or a network card) for uplink transmission. The SC-FDMA system 100 may, of course, also be utilized in combination with other communications standards and for downlink transmissions. The operation of the SC-FDMA system 100 will be described with reference to the schematic flow diagram of FIG. 3.

As shown in FIG. 2, the system 100 comprises a baseband modulator 102, an interpolator 104, a mapper 106 as well as a transmitter 118. The baseband modulator 102 is adapted to transform a binary input signal into a sequence of complex-valued symbols in one of several possible modulation formats such as BPSK or 16-QAM and to output the modulation symbols in individual sets (or blocks) each containing M symbols. The baseband modulator 102 may be further configured to adapt the modulation format (and thereby the transmission rate) for example in accordance with the current conditions of the transmission channel.

The interpolator 104 is adapted to receive the set of M input symbols in a time domain representation (step 302 in FIG. 3) and to subject the received symbol set to first interpolation operation in the time domain such that for the set of M input symbols a set of L interpolated symbols in the time domain is obtained (as indicated in step 304 of the flow diagram 300). The number L of interpolated symbols may be equal to or smaller than a number N of output symbols (i.e., L<=N). Moreover, each interpolated symbol may be calculated from a set K input symbols, with K<=M.

Figure 3:
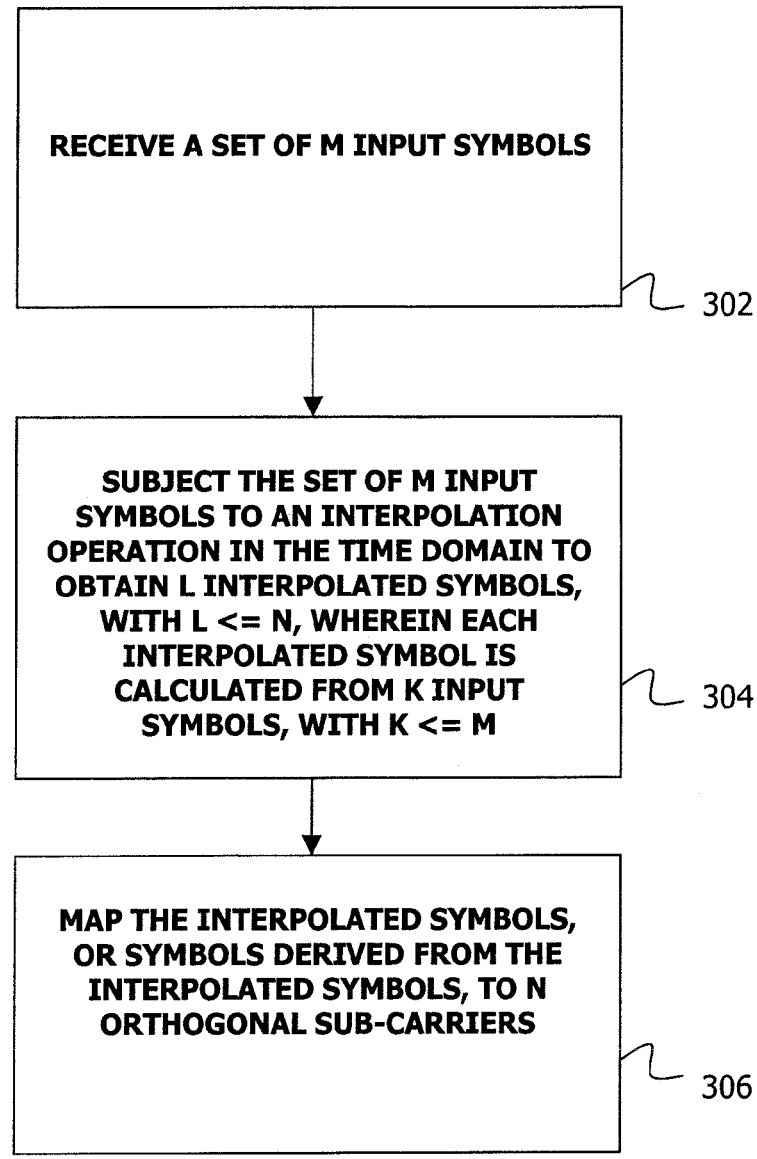
FIG. 3 shows a flow diagram according to a method embodiment.

The mapper 106 maps the L interpolated time-domain symbols output by the interpolator 104 (or symbols derived by one or more additional processing operations from the interpolated symbols output by the interpolator 104) to N orthogonal sub-carriers as indicated by step 306 in FIG. 3. From a frequency domain perspective, the mapping results in N sub-carrier amplitudes. M of these N sub-carrier amplitudes will typically be non-zero. When implementing the mapping operation using frequency domain processing, the mapping operation may sandwiched between FFT/IFFT operations (not shown in FIG. 2). It should be noted, however, that the mapping may also be performed purely by time domain processing.

Strictly speaking, the sub-carrier mapping operation is always related to the frequency domain. Thus, the sandwiching of the mapper 106 between an FFT/IFFT combination may be regarded as the "natural" approach. In the time domain, the mapping manifests itself as a phase rotation. Therefore, it is possible to perform the mapping without "looking" into the frequency domain (i.e. "indirectly") by purley applying just this phase rotation in the time domain. Both mapping variants will be explained below with reference to more detailed embodiments.

In the case the mapper 106 uses time domain processing, it will directly generate a set of N output symbols in a time domain representation. In the case of frequency domain processing, one or more transformation steps may be performed to obtain N output symbols in the time domain from the N sub-carrier amplitudes generated by the mapper 106.

The N output symbols are then passed to the transmitter 108. The transmitter 108 is adapted to transmit the N output symbols in accordance with the SC-FDMA principles. The time interval required to transmit the set of N output symbols once is also called transmission block. Several transmission blocks constitute one Transmission Time Interval (TTI). In the LTE standard, a typical TTI is 1 ms.

The signal thus transmitted by the transmitter 108 will be received by an LTE access network. In the access network, demodulation steps will be performed to recover the baseband symbols.

As has become apparent from FIGS. 2 and 3, the interpolation approach proposed herein permits at least in some cases a complete omission of any DFTs. The interpolation approach is based on the Nyquist theorem, according to which any time signal value between two signal samples can be calculated from all signal samples. This process can be interpreted as a filter operation with a sin x/x shaped impulse response (in the following called interpolation kernel).

Let L be the number of interpolated symbols generated for a set of M input symbols, then the number of operations will be in the order of K*L. To obtain an efficient implementation, each interpolated sample may be calculated from a subset of the input samples. That is, K may be selected such that K<M holds. Using the Nyquist theorem mentioned above, this corresponds to the application of a truncated sin x/x (or similar) pulse. It can be shown that this realization of the interplator 104 is optimal in the least mean square sense.

The truncation introduces a small error in the output signal that is reverse proportional to the length K<M of the interpolation kernel (filter length). The error can be reduced by tapering the interpolation kernel, and to this end a Kaiser-Bessel window or other techniques may be applied.

Figure 1:
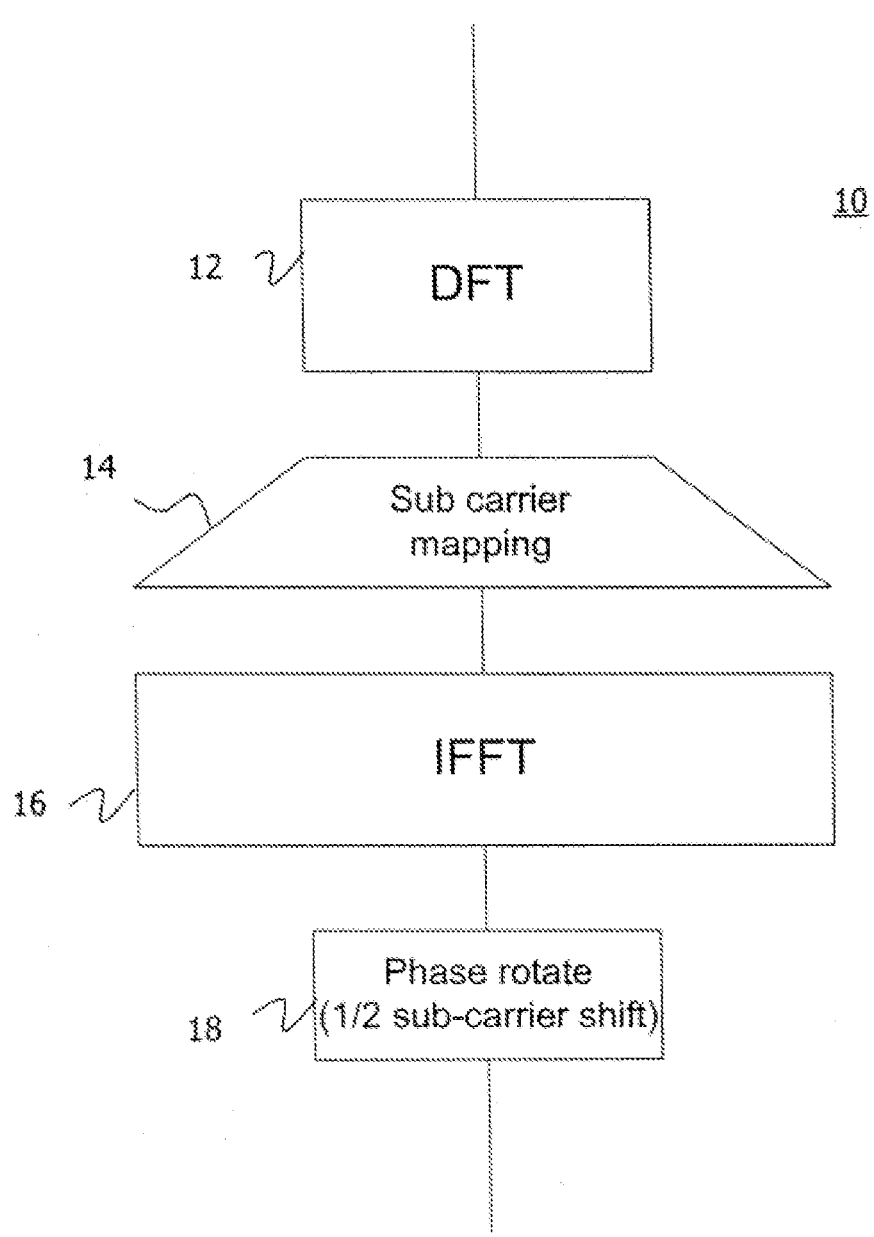
FIG. 1 schematically illustrates a possible implementation of an SC-FDMA modulator stage including a DFT block.
Figure 4:
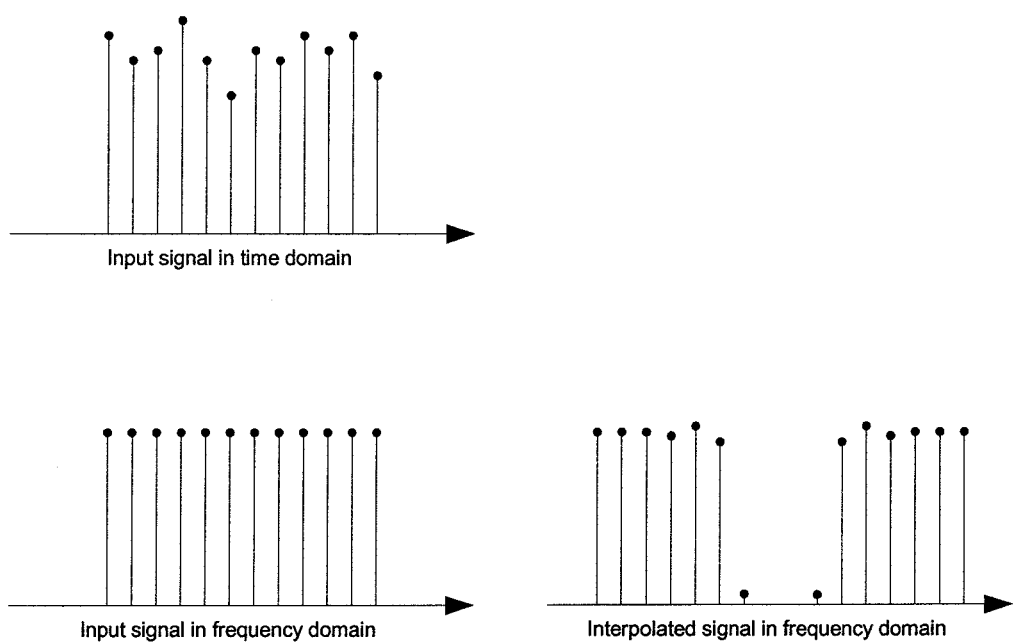
FIG. 4 schematically shows an input signal and the spectrum of an interpolated signal generated from the input signal.

The appearance of the truncation error is illustrated in FIG. 4. When applying a DFT/IFFT as illustrated in FIG. 1, then the DFT spectrum is divided in two halves and filled N−M zeros before being transformed back. Obviously, the same result will be obtained when the exact time domain interpolation according the Nyquist theorem is used. If, however, the interpolation kernel is truncated, then the spectral samples at the edges of the zero filling region are somewhat distorted, and a small amount of signal leakage will occur as illustrated on the right-hand side of FIG. 4 for the interpolated signal in the frequency domain.

The interpolator 104 of FIG. 2 may apply any interpolation method including, for example, also Lagrange interpolation. Furthermore, manifold realizations are possible by interpreting the interpolation, for example, as a Finite Impulse Response (FIR) filter operation. While such filter implementations are well known for the sin x/x interpolation, also Lagrange interpolation can be realized as filtering operation (e.g., using the so-called Farrow structure).

In the following, several exemplary realizations of an SC-FDMA modulator will be described in more detail. All those realizations may be based on the general system configuration shown in FIG. 1, or on any other system configuration.

A first realization that will be discussed in context with FIGS. 5A, 5B and 6 interpolates the sequence of input symbols such that the output symbols are generated directly (i.e., L=N). Such a one-step interpolation may be less efficient when then number of input symbols M is much smaller than the number of sub-carriers N, and a realization that uses two or more smaller interpolation steps can then be more efficient. In this regard, the first interpolation step may be an interpolation to the least but greater number of symbols on a "more convenient" grid, for example a power of two grid. After such an interpolation on a convenient grid, resource efficient FFTs can be utilized as illustrated for the realizations that will be discussed below in context with FIGS. 7A and 7B. Alternatively, the interpolation on a convenient grid could be followed by a filtering step as will be explained with reference to FIGS. 8A and 8B.

Figure 5A:
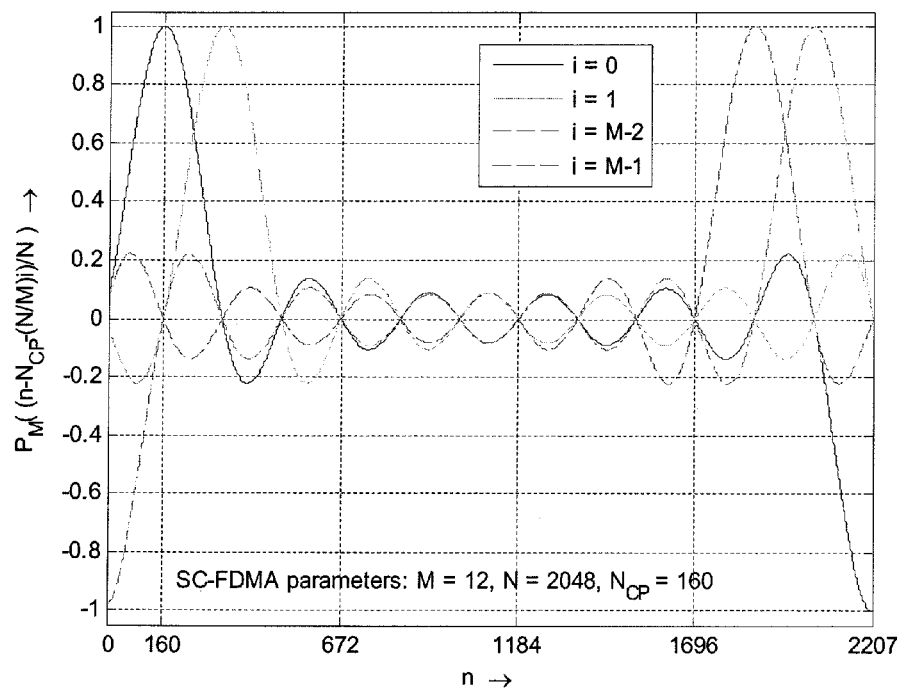
FIGS. 5A/5B show the pulse shapes of two exemplary SC-FDMA signals.
Figure 5B:
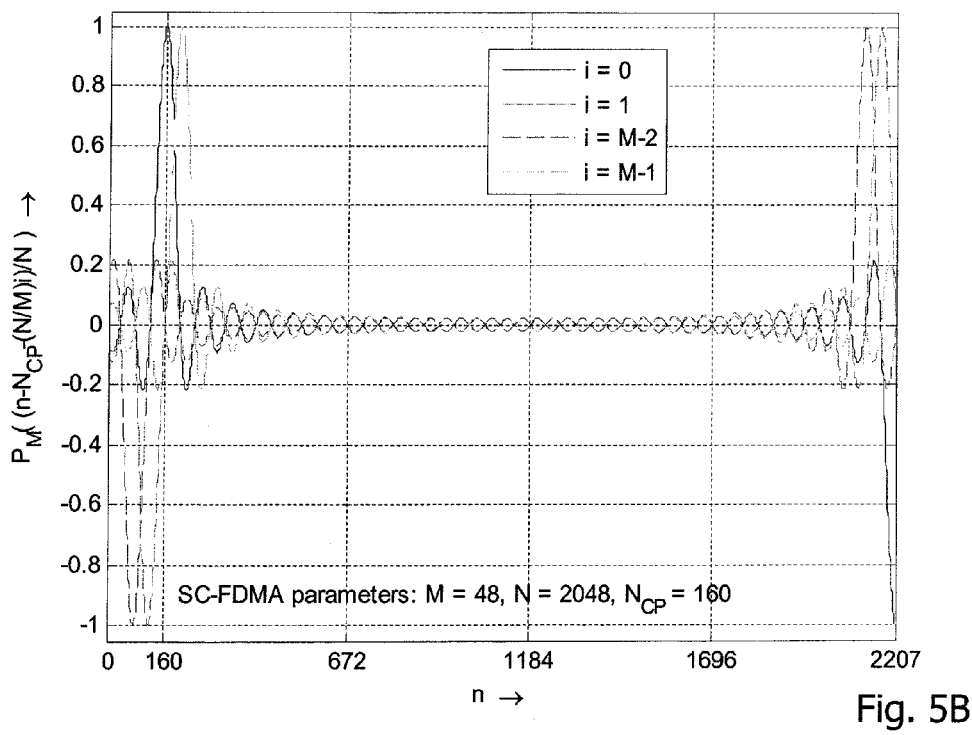
Figure 6:
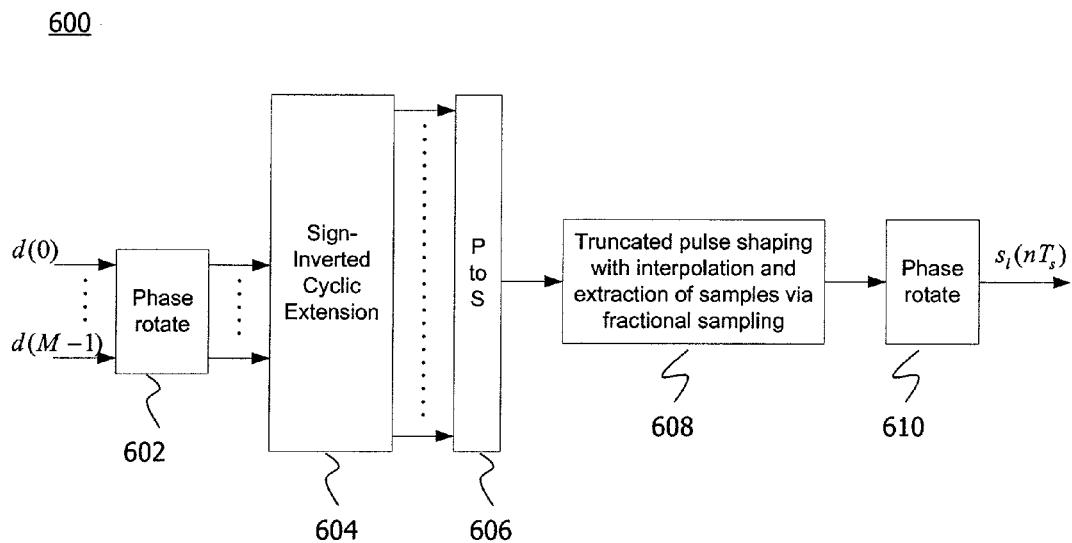
FIG. 6 schematically illustrates a second embodiment of an SC-FDMA modulator.

Referring now to FIGS. 5A, 5B and 6, a modulator realization will be discussed that generates the sequence of output symbols directly in one interpolation stage. To obtain a better understanding of this realization, some mathematical rearrangements with respect to the signal $s_l(nT_s)$ discussed above are helpful.

First, a new "symmetrical" frequency-domain index for the non-zero REs is introduced, which reads $$k' = k^{DFT} - M/2 \text{ with } -M/2 \leq k' < M/2$$

with the short form $$M = M_{sc}^{PUSCH},$$

which will be used exclusively in the following. Now the other frequency-domain indices are expressed by this new index, and one obtains $$k^{DFT} = k' + M/2$$

$$k^{(-)} = k' + M/2 + K$$

$$k = k' + M/2 + K - B.$$

With these relationships, one may use the expression for modulation symbols within the expression for the symbols of the SC-FDMA signal and obtain $$s_l(nT_s) = \sum_{k'=-M/2}^{M/2-1} \sum_{i=0}^{M-1} d(i) \cdot e^{-j2\pi(k'+M/2)i/M} \cdot e^{j2\pi(k'+M/2+K-B+1/2)(n-N_{CP,l})/N}.$$

This can be rewritten as $$s_l(nT_s) = \sum_{k'=-M/2}^{M/2-1} \sum_{i=0}^{M-1} d(i) \cdot e^{-j2\pi(k'+1/2+M/2-1/2)i/M} \cdot e^{j2\pi(k'+1/2+M/2+K-B)(n-N_{CP,l})/N},$$

which can be further rearranged as $$s_l(nT_s) = \sum_{i=0}^{M-1} d(i)$$

$$\sum_{k'=-M/2}^{M/2-1} e^{j2\pi(k'+1/2)((n-N_{CP,l})/N - i/M)} \cdot e^{-j\pi\frac{M-1}{M}i} \cdot e^{j2\pi(M/2+K-B)(n-N_{CP,l})/N}.$$

Now one can re-locate the phase-rotating factors to obtain $$s_l(nT_s) = e^{j2\pi(M/2+K-B)(n-N_{CP,l})/N}$$

$$\sum_{i=0}^{M-1} d(i) \cdot e^{-j\pi\frac{M-1}{M}i} \sum_{k'=-M/2}^{M/2-1} e^{j2\pi(k'+1/2)(n-N_{CP,l}-\frac{N}{M}i)/N}.$$

With the following definition for the pulse shape (it should be noted that it is real-valued)

$$\frac{1}{M}\sum_{k'=-M/2}^{M/2-1} e^{j2\pi(k'+1/2)x} = \frac{1}{M} e^{j\pi x} \frac{e^{jM\pi x} - e^{-jM\pi x}}{e^{j2\pi x} - 1}$$

$$= \frac{\sin(M\pi x)}{M\sin(\pi x)}$$

$$= P_M(x),$$

one obtains the final expression for a 3GPP-compliant signal, which reads $$s_l(nT_s) =$$

$$e^{j2\pi(M/2+K-B)(n-N_{CP,l})/N} \sum_{i=0}^{M-1} d(i) \cdot e^{-j\pi\frac{M-1}{M}i} \cdot MP_M\left(\left(n - N_{CP,l} - \frac{N}{M}i\right)/N\right).$$

The pulse shape is shown in FIG. 5A and FIG. 5B for two different RE allocations and for the following, it is important to note the sign-inverted periodicity for data symbol locations close to the edges. As shown in FIGS. 5A and 5B, the end portion of each signal can be regarded as a sign-inverted version of its front portion. FIG. 5A shows the SC-FDMA pulse shape for a minimum allocation of 12 REs in an uplink direction towards the access network, and FIG. 5B shows the SC-FDMA pulse shape for an allocation of 48 REs in the uplink.

When implementing a truncated (and possibly tapered) pulse shape instead of the full-length $P_M(x)$, the above formula can be interpreted as a phase rotation (frequency shift) of complex-valued data symbols d(i) plus sign-inverted (since M is always even and the pulse shape therefore has alternating positive and negative peaks) cyclic extension of input symbols followed by fractionally sampled pulse shaping plus another phase rotation (frequency shift). The cyclic extension needs to include the input symbols corresponding to the cyclic prefix $M|N_{CP,l}/N|$ plus symbols to either end, which cover the pulse shape duration.

FIG. 6 shows the signal processing components of an SC-FDMA modulator 600 adapted to perform the one-step interpolation in accordance with the formula that has been derived above. Specifically, the modulator 600 comprises a phase rotation block 602, a sign-inverted cyclic extension block 604, a parallel-to-serial converter 606, an interpolator 608 as well as further phase rotation block 610.

The first phase rotation block 602 receives consecutive sets of M complex-valued data symbols d(i) and performs the phase rotation indicated in the above formula within the summation sign directly after d(i) (to obtain d'(i)). The complex-valued data symbols d(i) may be received from a baseband modulator (not shown in FIG. 6) and may have been subjected to a serial-to-parallel conversion before being input to the phase rotation block 602. The M phase-rotated data symbols are then subjected to a cyclic extension with sign inversion for the samples in the extension region in block 604 to obtain more than M symbols. Mathematically, this can be expressed as d'(i)=−d'(l+M) mod M for i<0 or i>=M. The extended data symbols d'(i) are then subjected to a parallel-to-serial conversion in block 606 and fed into the interpolator 608.

The interpolator 608 performs a pulse shaping with interpolation using (for example) a truncated and possibly tapered version of the interpolation kernel $P_M(x)$ above. Truncation is performed such that only a specific region neighbouring the main pulse will be considered. As the output sample locations might be located between two points of the interpolation grid, fractional sampling is performed for extracting the actual output samples from the interpolated symbols.

The output samples are then input to the second phase rotation block 610 to perform in the time domain a sub-carrier mapping operation by frequency-shifting the signal by a specific amount of sub-carrier spacings. As a result, a set of N output symbols is obtained for each block of M input symbols. The remaining processing steps may be similar to the sub-carrier modulation and transmission steps discussed above in context with FIGS. 2 and 3.

Figure 7A:
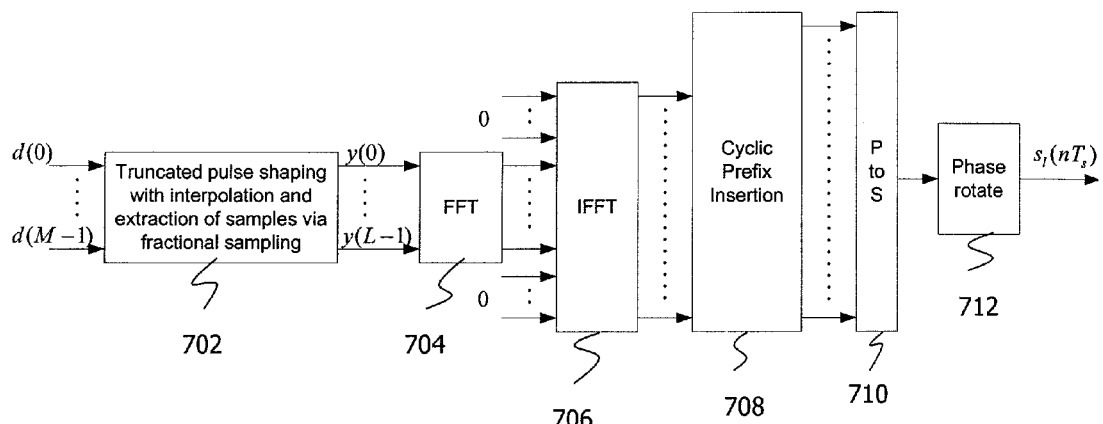
FIGS. 7A and 7B schematically illustrate a third and a fourth embodiment of an SC-FDMA modulator.
Figure 7B:
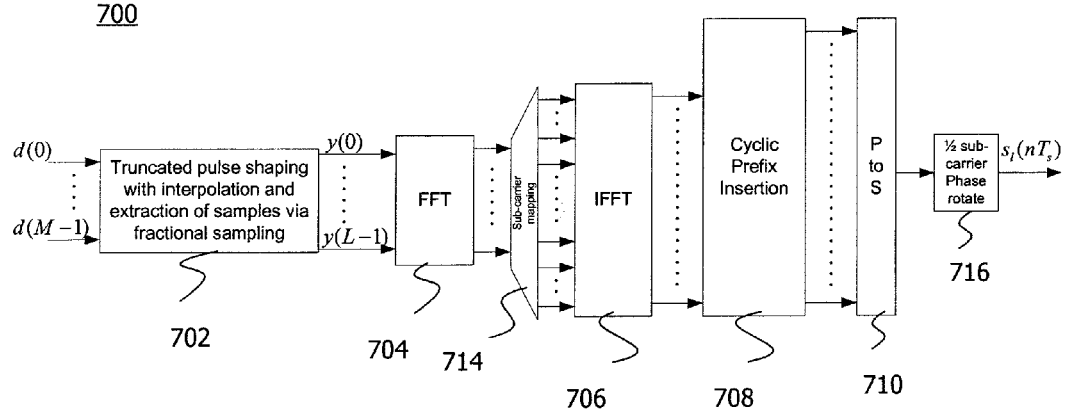

In FIGS. 7A and 7B further embodiments of SC-FDMA modulators 700 are shown. The same reference numerals are used to denote the same or similar components.

The idea underlying the embodiments shown in FIGS. 7A and 7B relates to the fact that an initial interpolation is performed such that the number L of interpolated symbols is a power of two. In such a case, the SC-FDMA signal generation can be based on a mixture of interpolation and FFT operations.

The SC-FDMA multiplexer 700 shown in FIG. 7A comprises an interpolator 702 having a similar construction as the interpolator 608 discussed above in context with FIG. 6. The interpolator 702 receives a serial-to-parallel converted symbol stream d(i) from a baseband modulator not shown in FIG. 7A. The interpolation operation is then performed such that the input symbol sequence of length M is converted into a number of L interpolated symbols y(i) such that $L=2^n$. For an efficient operation of the SC-FDMA multiplexer 700, L should be the smallest number with $L \geq N$.

Using the above equations, the interpolation performed by the interpolator 702 is described by $$y(lT_s) = \sum_{i=0}^{M-1} d(i) \cdot e^{-j\pi\frac{M-1}{M}i} \cdot MP_M\left(\left(l - \frac{L}{M}i\right)/L\right).$$

where $$P_M(x) = \frac{\sin(M\pi x)}{M\sin(\pi x)}$$

is interpreted as a filter response or pulse shaping that performs the interpolation. This filter response corresponds to the sin x/x function mentioned above, and FIG. 4 illustrates the filter result in the frequency domain.

Since the interpolator 702 generates a set of L interpolated symbols, and since L is a power of two, the conventional DFT can now be replaced by an FFT block 704 as shown in FIG. 7A. The FFT block 704 outputs L symbols in a frequency domain representation, and these L symbols are fed together with (N–L) zero values into an IFFT block 706. Although in FIG. 7A the FFT block 704 and the IFFT block 706 are shown as separate blocks, a practical hardware implementation needs to implement only a single block that is configured to perform both the FFT and the IFFT.

The IFFT block 706 outputs N symbols in a time domain representation. Then, a cyclic prefix is added to the set of output symbols of the IFFT block 706 in the cyclic prefix extension block 708. The symbols output by the cyclic prefix extension block 708 are subjected to a parallel-to-serial conversion in block 710, and to a subsequent phase rotation for sub-carrier mapping purposes in a block 712. The phase rotation block 712 thus outputs the final SC-FDMA signal $s_l(nT_s)$ comprising N output symbols. The position of the phase rotation block 712 is not restricted to the position shown in FIG. 7A. Other positions such as directly after the IFFT block 706 could be chosen as well.

Since the FFT in block 704 of the SC-FDMA modulator 700 shown in FIG. 7A is much more resource efficient than a DFT, the overall complexity of the SC-FDMA modulator 700 is considerably decreased. The decreased complexity results in an improved behaviour as regards latency and power dissipation. Moreover, the number of gates and the chip area of a hardware implementation of SC-FDMA modulator 700 (e.g., in the form of an ASIC) can be reduced also.

A further embodiment of an SC-FDMA modulator 700 is shown in FIG. 7B. Since the embodiment shown in FIG. 7A is to large extent similar to the embodiment shown in FIG. 7A, only the differences will be discussed hereinafter.

As explained above in context with FIG. 7A, the SC-FDMA signal will be available in the frequency domain between the FFT block 704 and the IFFT block 706. This fact permits to perform the sub-carrier mapping in the frequency domain in similar manner as shown in FIG. 1. Specifically, a sub-carrier mapping block 714 may be inserted between the FFT block 704 and the IFFT block 706. As a result, the phase rotation block 712 shown in FIG. 7A may be modified such that it performs no longer any sub-carrier mapping operations. Rather, it may be replaced by a phase rotation block 716 that merely compensates any phase errors that have been introduced by previous processing operations.

Figure 8A:
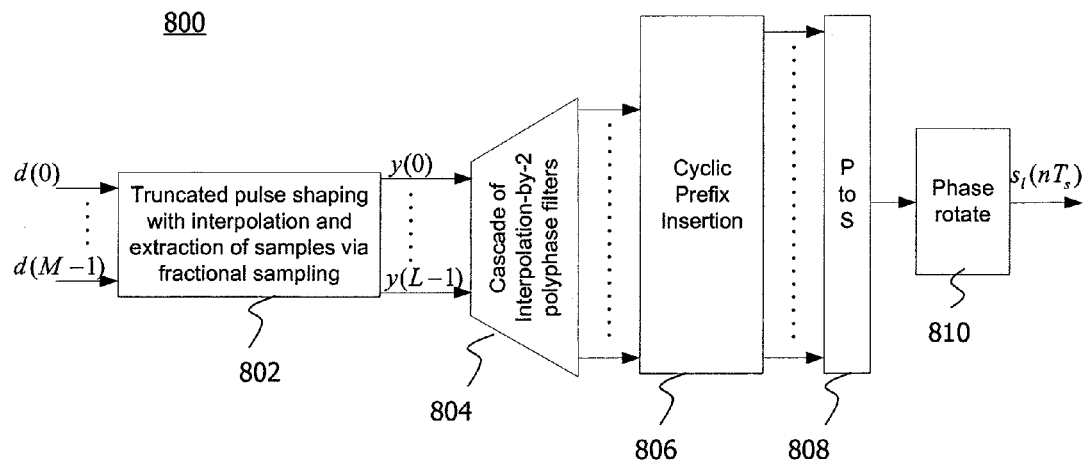
FIGS. 8A and 8B schematically illustrate a fifth embodiment of an SC-FDMA modulator and an interpolation filtering operation.

A still further embodiment of an SC-FDMA modulator 800 will now be described with reference to FIGS. 8A and 8B. The present embodiment has some similarities with the embodiments discussed above with reference to FIGS. 7A and 7B in that a similar interpolator 802 is utilized. In other words, the interpolator 802 interpolates the M input symbols d(i) in an initial (small) step to obtain L interpolated output symbols y(i). However, L is now additionally chosen such that it is a power of two fraction of N (i.e. of the number of available sub-carriers). In such a case, the FFT/IFFT operations discussed above with respect to FIGS. 7A and 7B can be replaced by a filter cascade 804. The filter cascade 804 includes several half band or poly-phase filters each interpolating by a factor of two.

The output symbols of the filter cascade 804 may then be processed in a cyclic prefix extension block 806, in a parallel-to-serial conversion block 808 and in a phase rotation block 810 in a similar manner as described for the blocks 708, 710 and 712 in relation to the embodiment of FIG. 7A to obtain N time domain output symbols.

The interpolation performed by the interpolator 802 may be cyclic to preserve the DFT properties that discrete time and frequency domain representations at the input and output, respectively, and vice versa of the DFT correspond to one period of a cyclically continued infinite long signal. Moreover, the filter cascade 804 may interpolate in a cyclic manner or, after extending the input signal with a cyclic prefix and/or postfix corresponding to the interpolation kernel length, non-cyclically. The non-cyclic filter operation is exemplarily shown in FIG. 8B.

Figure 8B:
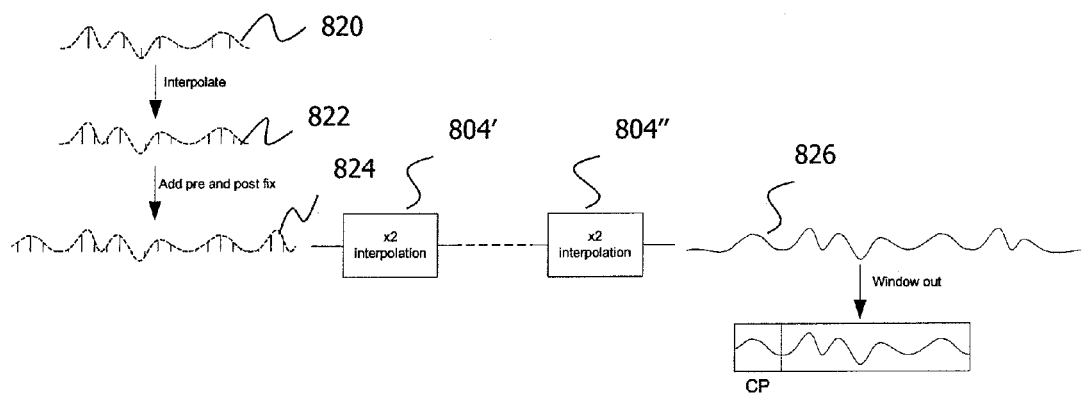

FIG. 8B illustrates for a time-continuous input signal 820 the interpolation step performed by interpolator 802 to obtain an interpolated signal 822. FIG. 8B further illustrates the addition of a cyclic prefix and postfix corresponding to the length of interpolation kernel of the interpolator 802 to obtain an extended signal 824. The extended signal 824 is then subjected to a plurality of interpolation stages 804', 804'' which each interpolate by a factor of 2. The interpolated signal 826 output by the filter cascade 804 is then subjected to a windowing operation to extract the correct signal part at the end of the filter cascade 804.

In the above embodiments, the initial interpolation step may be performed with respect to a variable input signal length. In other words, the number M of input symbols processed by the SC-FDMA modulator to generate a single transmission block may change from time to time depending for example on environmental constraints or user settings. In one implementation, the first interpolation step is performed such that regardless of any changes of M, a set of M input samples always yields exactly L interpolated samples, with L remaining constant.

In order to be able to interpolate all possible input signal lengths M, the interpolation kernel (e.g., the FIR filter coefficients) of the initial interpolation may be sampled such that the sampling frequency is the least common divider of all sample frequencies for the input and output signals. This approach may give a very dense sampling grid and thus a high number of samples. This may be undesirable in certain situations and can be avoided by using an interpolation kernel oversampled by a sufficiently high factor compared to the longest input or output signal. In this case, missing samples can be obtained by linear or step-wise interpolation between the filter samples. The additional error introduced by such an approach is typically much smaller than any truncation errors.

As has been mentioned above, such truncation errors are the result of a possibly truncated form of $P_M(x)$ that may be used to obtain a resource-efficient solution. It should be noted that the use of $P_M(x)$ is not mandatory, and that other pulse shaping functions which reasonably have characteristics similar to $P_M(x)$ can be used alternatively. For example, $P_M(x)$ can be multiplied with a tapering window to minimize truncation errors. In this regard, a Kaiser-Bessel window can be used.

Accordingly, it has been found that the DFT hitherto proposed for SC-FDMA modulators can at least partially be replaced by an interpolation operation (plus, if necessary, one more further processing operations). In particular, the combination of an initial time interpolation using, for example, an oversampled FIR filter with linearly or step-wise interpolated coefficients and followed by further processing components (such as a cascade of halfband interpolation filters) yields a very efficient implementation of an SC-FDMA modulator.

By avoiding conventional DFTs simple and resource-efficient implementations of the SC-FDMA modulator become possible. The number of required operations is in the order of a conventional FFT and scales with the number of input symbols. In particular, and compared to DFT solutions, a reduced number of multiplications is needed to generate an SC-FDMA signal. Also, there is no restriction on the number of input symbols that may be processed at a time.

The pulse shape underlying the initial interpolation can be optimized in several ways. For example, the pulse shape can be modified such that a good trade-off between Error Vector Magnitude (EVM) and spectral containment within the frequency resources allocated to a specific transmitter is obtained. Moreover, the output symbol rate can be chosen as required by the specific radio architecture. Thus, a base-band signal with 52 MHz or 104 MHz sampling rate can be produced directly. Furthermore, word-length effects along the transmitter chain and the average output power of the SC-FDMA modulator may be controlled easily.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of generating a single carrier frequency division multiple access (SC-FDMA) signal, wherein from a set of M input symbols, a set of N output symbols is generated, with M<N, the method comprising:
receiving a set of M input symbols in a time domain representation;
subjecting the set of M input symbols to a first interpolation operation in the time domain to obtain L interpolated symbols, with L<=N, wherein each interpolated symbol is calculated from K input symbols, with K<=M;
mapping the L interpolated symbols, or symbols derived from the L interpolated symbols, to N orthogonal sub-carriers; and
outputting a set of N output symbols in a time domain representation.

2. The method of claim 1, further comprising:
transmitting the set of N output symbols in a single transmission block.

3. The method of claim 1, further comprising:
changing the size of the set of M input symbols that are being received; and
maintaining the number of L interpolated symbols that are calculated from the M input symbols and/or the number of K input symbols that are used to calculate each interpolated sample constant.

4. The method of claim 1, wherein K<M.

5. The method of claim 1, wherein the first interpolation operation has an interpolation kernel.

6. The method of claim 5, wherein the interpolation kernel corresponds to a pulse shape with a main pulse and side pulses.

7. The method of claim 1, wherein the mapping comprises a phase rotation operation in the time domain.

8. The method of claim 1, further comprising subjecting the M input symbols to a phase rotation operation prior to the first interpolation operation.

9. The method of claim 1, further comprising performing a cyclic extension operation.

10. The method of claim 9, comprising cyclically extending the M input symbols prior to the first interpolation operation.

11. The method of claim 1, wherein the first interpolation operation is controlled such that from the set of M input symbols, a set of L interpolated symbols is obtained, wherein $L=2^n$, with n=0, 1, 2, 3, ....

12. The method of claim 11, wherein the number L of interpolated symbols is additionally chosen to be a smallest number for which L>=M holds.

13. The method of claim 11, wherein the first interpolation operation is described by:

$$y(lT_s) = \sum_{i=0}^{M-1} d(i) \cdot e^{-j\pi \frac{M-1}{M} i} \cdot MP_M\left(\left(l - \frac{L}{M}i\right)/L\right)$$

where $$P_M(x) = \frac{\sin(M\pi x)}{M \sin(\pi x)},$$

with
d(i) being the i th input symbol; and
l=0, 1, ... L-1.

14. The method of claim 11, wherein the number L of interpolated symbols is additionally chosen to be a power of two fraction of the number N of output symbols.

15. The method of claim 1, further comprising performing one or more second interpolation operations using a filter cascade with a plurality of filter stages, each filter stage interpolating by a factor of two.

16. The method of claim 11, further comprising subjecting the L interpolated symbols obtained by the first interpolation operation to a Fast Fourier Transform (FFT).

17. The method of claim 16, wherein symbols generated by the FFT are subjected to an Inverse FFT (IFFT).

18. The method of claim 17, further comprising subjecting the symbols generated by the FFT to a sub-carrier mapping operation in the frequency domain before performing the IFFT.

19. A computer program product comprising program code portions for performing the steps of claim 1 when the computer program product stored on a non-transitory computer-readable medium is executed on one or more computing devices.

20. A single carrier frequency division multiple access (SC-FDMA) modulator adapted to generate from a set of M input symbols received in a time domain representation, a set of N output symbols, with M<N, the modulator comprising:
an interpolator adapted to subject the set of M input symbols to a first interpolation operation in the time domain to obtain L interpolated symbols, with L<=N, wherein each interpolated symbol is calculated from K input symbols, with K<=M; and
a mapper adapted to map the L interpolated symbols, or symbols derived from the I interpolated symbols, to N orthogonal sub-carriers, wherein a set of N output symbols in a time domain representation is obtained.

21. The modulator of claim 20, further comprising:
a transmitter adapted to transmit the set of N output symbols in a single transmission block.

22. The modulator of claim 20, further comprising
a Fast Fourier Transform (FFT) module adapted to subject the L interpolated symbols obtained by the first interpolation operation to a FFT; and an Inverse FFT (IFFT) module adapted to subject symbols generated by the FFT module to an IFFT.

23. The modulator of claim 22, wherein the mapper is arranged between the FFT module and the IFFT module and adapted to operate in the frequency domain.

24. The modulator of claim 22, wherein the mapper is arranged after the IFFT module and adapted to operate in the time domain.

25. The modulator of claim 20, further comprising a filter cascade adapted to perform one or more second interpolation operations, the filter cascade having a plurality of filter stages and each filter stage interpolating by a factor of two.

\* \* \* \* \*